(12) United States Patent
Przybyla (10) Patent No.: US 10,383,181 B2
(45) Date of Patent: Aug. 13, 2019

(54) RF HEATING OF A DIELECTRIC FLUID

(75) Inventor: Jan S. Przybyla, Chelmsford (GB)

(73) Assignee: Teledyne e2v (UK) Limited, Thousand Oaks, CA (US)

( * ) Notice: Subject to any disclaimer, the term of this patent is extended or adjusted under 35 U.S.C. 154(b) by 889 days.

(21) Appl. No.: 12/867,655

(22) PCT Filed: Feb. 10, 2009

(86) PCT No.: PCT/GB2009/050131
§ 371 (c)(1),
(2), (4) Date: Nov. 3, 2010

(87) PCT Pub. No.: WO2009/101436
PCT Pub. Date: Aug. 20, 2009

(65) Prior Publication Data
US 2011/0049133 A1    Mar. 3, 2011

(30) Foreign Application Priority Data
Feb. 15, 2008    (GB) .................................. 0802845.8

(51) Int. Cl.
*H05B 6/10*    (2006.01)
*H05B 6/54*    (2006.01)
(Continued)

(52) U.S. Cl.
CPC .............. *H05B 6/54* (2013.01); *B01D 17/06* (2013.01); *C10G 33/02* (2013.01); *H05B 6/108* (2013.01); *H05B 6/60* (2013.01)

(58) Field of Classification Search
CPC .... B01D 17/06; B01D 17/0211; B01D 17/04; C10G 33/02; H05B 6/60; H05B 6/54; H05B 6/108
(Continued)

(56) References Cited

U.S. PATENT DOCUMENTS

| 4,257,895 A | 3/1981 | Murdock |
| 4,889,639 A | 12/1989 | Hudgins et al. |

(Continued)

FOREIGN PATENT DOCUMENTS

| DE | 102007039115 A1 | 1/2009 |
| EP | 0096739 A1 | 12/1983 |

(Continued)

OTHER PUBLICATIONS

UK Search Report, dated Jun. 12, 2008, for related Application No. GB0802845.8.

(Continued)

*Primary Examiner* — Hung D Nguyen
(74) *Attorney, Agent, or Firm* — FisherBroyles, LLP; Robert Kinberg (57) ABSTRACT

An apparatus for applying electromagnetic energy to a dielectric fluid includes a chamber to contain the dielectric fluid. At least three parallel or coaxial electrode plates are arranged within the chamber to apply substantially equal electromagnetic energy per unit volume of the dielectric fluid between neighboring ones of the at least three electrode plates. Electrical conductors are electrically connected to electrode plates to apply a radio frequency electric field between neighboring ones of the at least three electrode plates. In one embodiment the electrode are connected in series and in another embodiment the electrodes are connected in parallel.

16 Claims, 7 Drawing Sheets

(51) Int. Cl.
*B01D 17/06* (2006.01)
*C10G 33/02* (2006.01)
*H05B 6/60* (2006.01)

(58) Field of Classification Search
USPC ........ 219/647, 628, 629, 669, 780; 204/660, 204/663, 664, 670–674; 210/104, 748.01, 210/748.17, 748.02
See application file for complete search history.

(56) References Cited

U.S. PATENT DOCUMENTS

| | | | |
|---|---|---|---|
| 5,326,446 A * | 7/1994 | Binger | 204/663 |
| 5,338,421 A * | 8/1994 | Abe | B01D 21/0009 |
| | | | 204/663 |
| 5,580,464 A | 12/1996 | Bailes | |
| 5,865,992 A | 2/1999 | Edmondson | |
| 5,914,014 A | 6/1999 | Kartchner | |
| 6,077,400 A | 6/2000 | Kartchner | |
| 6,086,830 A | 7/2000 | Kartchner | |
| 6,184,427 B1 | 2/2001 | Klepfer et al. | |
| 2001/0017264 A1 | 8/2001 | Klippel et al. | |
| 2004/0026335 A1* | 2/2004 | Fields | C02F 9/00 |
| | | | 210/748.11 |
| 2004/0069611 A1* | 4/2004 | MacGregor | A61L 2/02 |
| | | | 204/660 |
| 2004/0238365 A1* | 12/2004 | Tipton et al. | 204/660 |
| 2005/0230296 A1 | 10/2005 | Edmondson | |

FOREIGN PATENT DOCUMENTS

| | | |
|---|---|---|
| EP | 0468954 A2 | 1/1992 |
| EP | 1524883 A1 | 4/2005 |
| GB | 994450 A | 6/1965 |
| GB | 1155784 A | 6/1969 |
| GB | 1247500 A | 9/1971 |
| GB | 1327991 A | 8/1973 |
| RU | 2030126 C1 | 2/1995 |
| RU | 2075839 C1 | 3/1997 |
| RU | 2127029 C1 | 2/1999 |
| WO | 94/20209 A | 9/1994 |
| WO | 2006/128030 A2 | 11/2006 |

OTHER PUBLICATIONS

International Search Report for PCT/GB2009/050131, dated Jul. 28, 2009.
Written Opinion for PCT/GB2009/050131, dated Jul. 28, 2009.
International Preliminary Report on Patentability for PCT/GB2009/050131, dated Aug. 17, 2010.

* cited by examiner

RF HEATING OF A DIELECTRIC FLUID

BACKGROUND OF THE INVENTION

This invention relates to heating a dielectric fluid or fluidized particles or particulates and in particular heating an oil and water emulsion or dispersion to facilitate separation thereof.

Water-oil emulsions are almost invariably produced in the extraction of crude oil and are most likely to occur if water flooding is used to maximise recovery of oil from an oil well.

It is desirable to reduce water content of the emulsion to less than 0.5% before the oil is delivered to a refinery. For premium oils a lower concentration of 0.2% water is required. Traditionally, settling tanks are used to allow constituents of an oil and water emulsion or dispersion to separate, possibly using at least one of surfactants and electric precipitators, but this is a time-consuming process and does not maximise recovery.

Thus electrostatic precipitation, which causes water globules to coalesce, is known from, for example, GB 1,155,784 which discloses electrostatic precipitation of water suspended in oil in the presence of synthetic thermoplastic polymers as coalescers, in which the liquid flows through an electric field of from 1 to 60 kV.

GB 1,247,500 discloses a treater for resolving oil-water emulsions containing gas including electrical treatment of emulsions for removal of water in an upward flow. A plurality of vertically disposed screen electrodes may be used with ground electrodes positioned between adjacent pairs of high-voltage electrodes.

GB 1,327,991 discloses a phase separator for immiscible fluids including an outlet separation zone including energized electrodes creating an electric field which enhances coalescence of residual water. Electrodes are supplied from a transformer so apparently an AC field or pulsed field is applied. The electrodes are separated by 4-10 inches (10.2-25.4 cm) and are subjected to 10 kV to 30 kV.

EP 0468954 discloses breaking of oil-in-water or water-in-oil emulsions by subjection to a constant-voltage field to provide a polarisation of the emulsion and an alternating field superimposed on the constant-voltage field.

U.S. Pat. No. 4,257,895 discloses the separation of oil and water from an emulsion in which the emulsion flows vertically through an electric field between two plate electrodes.

U.S. Pat. No. 5,580,464 discloses separation of, for example, a water-in-oil emulsion by introducing bubbles of an electrically insulating gas while applying an electric or electrostatic field across the emulsion, using insulated electrodes. Reference is made to previously known methods of applying a high voltage gradient, AC fields, pulsed AC fields, DC fields and pulsed DC fields. The electric or electrostatic field is applied using one or more pairs of electrodes applying a voltage of 10 to 20 kV pulsed at 1.5 to 50 Hz. The emulsion flows through the electric field. Insulated electrodes are used to apply a pulsed DC field or un-insulated electrodes to apply an AC field.

U.S. Pat. No. 5,865,992 discloses an oil, water and gas separator including an electric field through which the oil can flow downwardly for coalescing water drops entrained within the oil.

US 2001/0017264 discloses a method of separating an insulating liquid from a dispersum, particularly water dispersed in oil, by applying a pulsating electric field of 5-30 kV having a frequency between 60 Hz and 1 kHz dependent on a monitored conductivity of the dispersum. A pulsed DC field of 0.5-5 kV may be applied upstream of the variable frequency field to charge the water droplets and a separating AC field applied downstream of the variable frequency field.

US 2005/0230296 discloses an oil and water separator including downward flow of the oil and water emulsion through an electric field to coalesce entrained water drops for faster gravity separation. The downward flow purges the coalesced water drops from the electric field preventing a high water concentration causing an electrical short circuit.

Emulsions with a relatively low concentration of water, for example less than 25%, take longer to settle out than emulsions with a relatively higher water concentration, because the water globules tend to be smaller and settling is a balance between gravitational and surface tension forces, which are larger in the smaller globules.

If, alternatively, a water-oil emulsion is subjected to microwaves, heat produced by absorption of radiation in the water droplets may be transferred to the oil by conduction, lowering the viscosity of the oil and aiding separation.

U.S. Pat. No. 4,889,639 discloses microwave separation of an emulsion, particularly for enhancing separation of an oil and water emulsion using re-circulating oily water from a separator tank or using water from a separate source. An applicator is provided with an inlet and outlet for passage of an oil-water emulsion or dispersion. Magnets are provided in a microwave circulator located between a microwave source and a waveguide to deflect reflected microwave energy into a water load chamber on the circulator.

U.S. Pat. No. 5,914,014 discloses a microwave applicator to break hydrocarbon and water emulsions. A stream of a hydrocarbon and water emulsion is pumped into a multi-mode resonant re-entrant microwave cavity. Dual opposing emulsion flow chambers, with a centrally supplied microwave waveguide, form a double ended resonant chamber with multiple RF energy reflections to treat the flowing emulsion. An RF energy applicator reflects energy into the dual opposed RF terminal cavities using angled reflector plates located at a terminal end of a rectangular waveguide. Feedstock flow is upward against gravity to prevent entrained solids from becoming trapped within the resonator cavities. The dual opposed RF terminal cavities act as one multimode resonant re-entrant microwave cavity to absorb microwave energy. The re-entrant chamber dimensions closely match microwave standing wave patterns for predetermined dielectric properties of the oil and water mixture flowing through the dual opposed cavities. A three port circulator is located between a transmitter and the microwave applicator to divert any reflected RF to a water-cooled dummy load. U.S. Pat. Nos. 6,077,400 and 6,086,830 disclose details of feedstock preheating, filtering, and temperature range and details of chamber materials and design for substantially the same apparatus.

U.S. Pat. No. 6,184,427 contemplates recycling waste plastics by treating the waste material with microwaves by passing the waste material through an electric field either generated by a plate capacitor or a ring electrode structure.

SUMMARY OF THE INVENTION

According to a first aspect of the present invention there is provided an apparatus for applying electromagnetic energy to heat a dielectric fluid comprising: chamber means arranged for containing the dielectric fluid; at least three electrode means spaced apart across one dimension of the chamber means; and electrical conductor means electrically connected to the electrode means arranged for applying respective radio frequency electric fields between neighboring ones of the electrode means, such that at least two such regions of radio frequency field are set up across that dimension of the chamber means.

Conveniently, the at least three electrode means are arranged to apply substantially equal electromagnetic energy per unit volume of the dielectric fluid between neighboring ones of the at least three electrode means.

Advantageously, areas and spacing of neighboring pairs of electrode means are determined dependent on a volume and flow rate of dielectric fluid therebetween such that substantially equal electromagnetic energy per unit volume of dielectric fluid is applied between neighboring ones of the at least three electrode means.

Conveniently, the chamber means is of substantially circular cross-section.

Conveniently, the at least three electrode means are substantially planar and substantially mutually parallel or substantially cylindrical and substantially coaxial.

Advantageously, the apparatus is arranged to apply a substantially equal electromagnetic field between neighboring ones of the at least three electrode means.

Conveniently, neighboring electrode means have differing vertical extents and differing horizontal extents and a substantially equal area.

Conveniently, the chamber is cylindrical.

Advantageously, the dielectric chamber means comprises inlet means and outlet means arranged to allow the dielectric fluid to be irradiated as the dielectric fluid flows through the chamber means.

Conveniently, the apparatus is arranged to cause the dielectric fluid to flow in substantially parallel flow streams in a same direction between the neighboring ones of the at least three electrode means.

Conveniently, the dielectric chamber means is a right circular cylinder.

Advantageously, the apparatus comprises radio frequency generator means for applying radio frequency energy within the chamber means.

Advantageously, the apparatus is arranged to irradiate an oil and water emulsion or an oil and water dispersion.

According to a second aspect of the invention, there is provided a method of heating a dielectric fluid by applying electromagnetic energy comprising: containing the dielectric fluid in chamber means wherein at least three electrode means are spaced apart across one dimension of the chamber means; and applying respective radio frequency electric fields between neighboring ones of the electrode means, such that at least two such regions of radio frequency field are set up across that dimension of the chamber means.

Conveniently, the method comprises applying substantially equal radio frequency electromagnetic energy per unit volume of dielectric fluid between neighboring ones of the at least three electrode means.

Conveniently, applying radio frequency electromagnetic energy comprises applying a substantially equal radio frequency electric field between neighboring ones of the at least three electrode means.

Conveniently, the at least three electrode means have differing vertical extents and differing horizontal extents and a substantially equal area.

Advantageously, the method further comprises flowing the dielectric fluid through inlet means and outlet means of the chamber means for irradiation of the dielectric fluid within the chamber means.

Conveniently, the method comprises flowing the dielectric fluid in substantially parallel flow streams in a same direction between the neighboring ones of the at least three electrode means.

Advantageously, the method comprises irradiating an oil and water emulsion or an oil and water dispersion.

BRIEF DESCRIPTION OF THE DRAWINGS

The invention will now be described, by way of example, with reference to the accompanying drawings in which.

DETAILED DESCRIPTION

In the Figures like reference numerals denote like parts.

Figure 1:
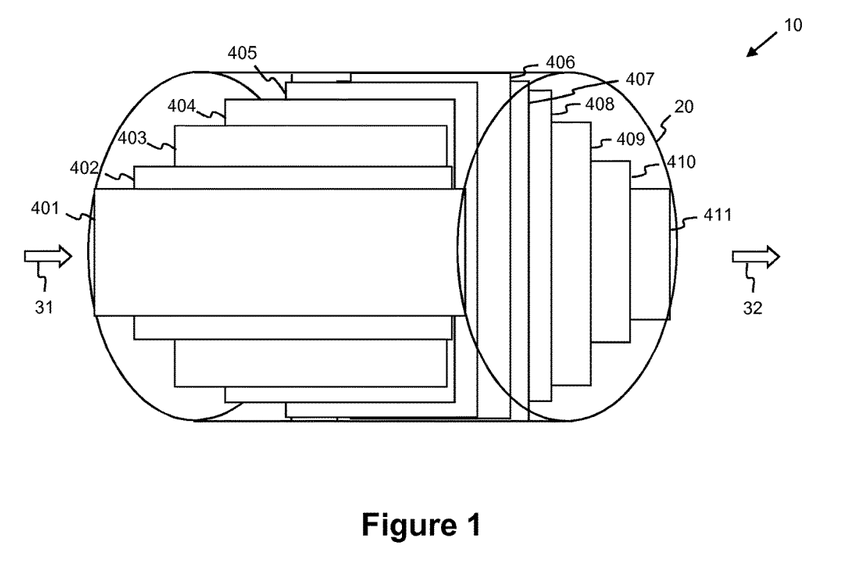
FIG. 1 is a schematic perspective drawing of an RF applicator according to the invention.
Figure 2:
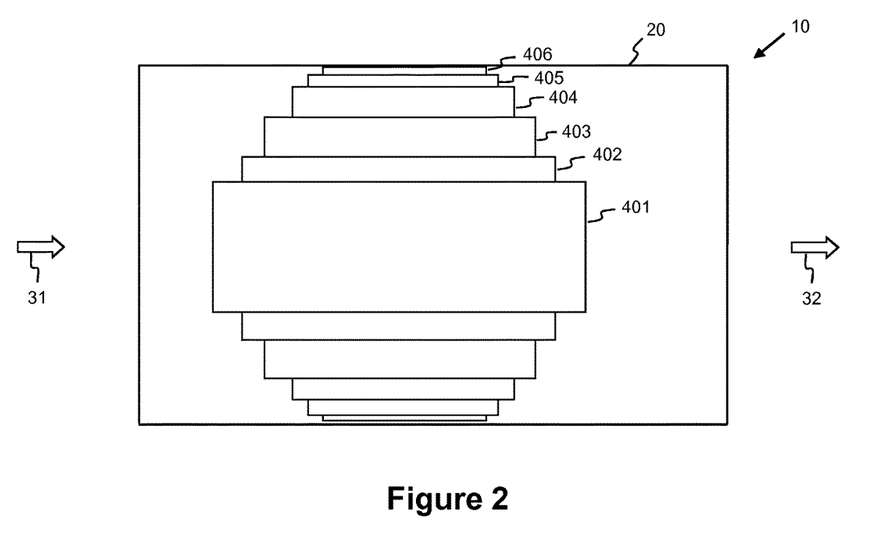
FIG. 2 is a side view of the applicator of FIG. 1.

Referring to FIG. 1, an RF applicator 10 according to the invention includes a right circular cylindrical treatment chamber 20, such as a portion of pipeline, through which an emulsion to be treated can flow horizontally as illustrated or at an angle inclined to the horizontal or substantially vertically. Within the treatment chamber are a plurality of parallel vertical electrode or capacitor plates 401-411 extending substantially from an upper portion of the cylinder wall to a lower portion of the cylinder wall. Plates closer to the centre of the chamber therefore have a larger vertical extent than plates further from the centre of the chamber. In order desirably to apply a same field to an emulsion passing between any of the plates it is desirable that a substantially equal capacitance exists between each adjacent pair of plates. Since the capacitance is proportional to the area of the plates and inversely proportional to a distance between them, such equal capacitance may be achieved by varying either the area or the distance between the plates or a combination of area and distance. In the embodiments shown in FIGS. 1 to 5 the plates are substantially equidistant and because the heights of the plates are different from each other in order to be accommodated in the cylindrical chamber, the lengths of the plates are also made to be different so that all plates are of substantially an equal area.

Figure 3:
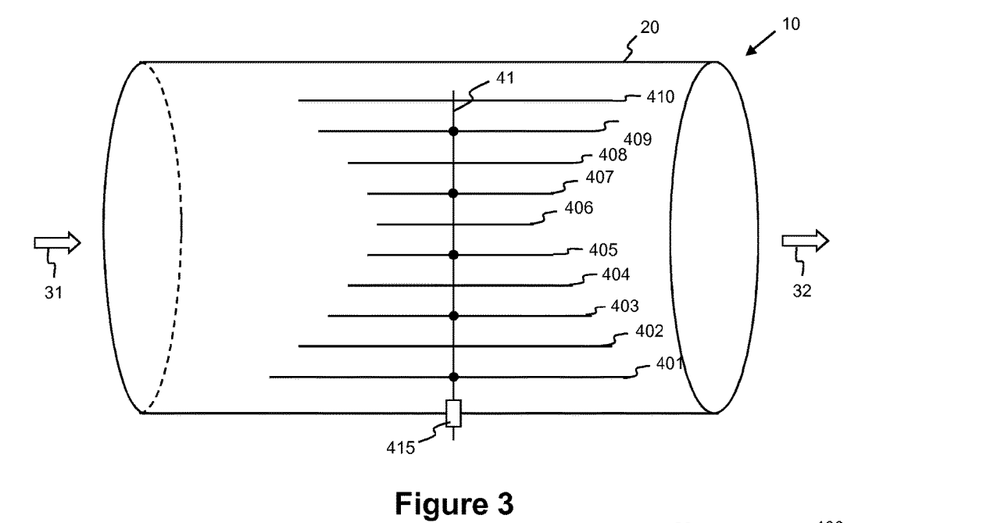
FIG. 3 is a top view of an embodiment of the applicator of FIG. 1 in which the capacitor plates are connected in parallel.
Figure 5:
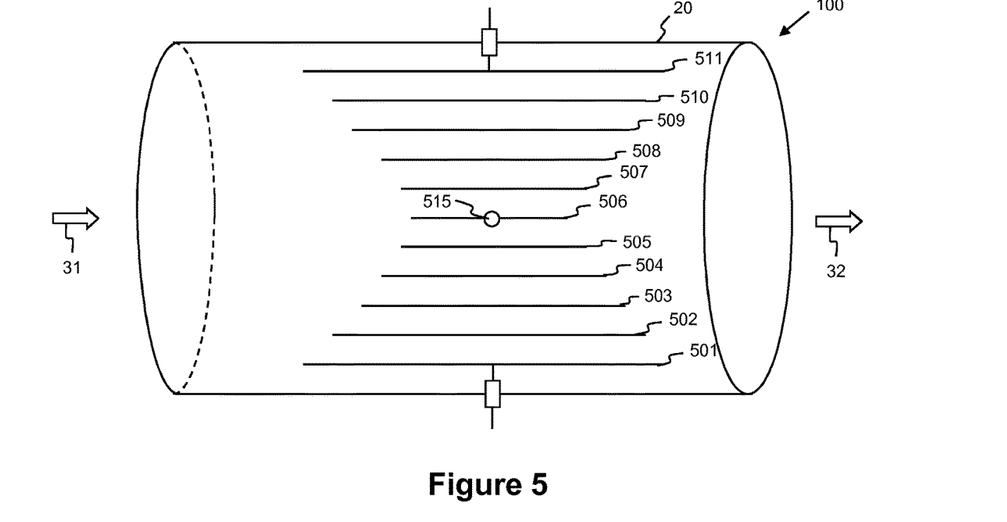
FIG. 5 is a top view of an embodiment of the applicator of FIG. 1 in which the capacitor plates are connected in series.

Thus as best seen in the plan views of different embodiments in FIGS. 3 and 5, plates are progressively longer, in a direction parallel to a longitudinal axis of the cylindrical chamber, moving from a central plate 406; 506 to the outermost plates 401, 410; 501, 511.

A radio frequency band may be envisaged as extending from 30 kHz to 300 GHz but a preferred range for the present invention is 1 MHz to 100 MHz. Below 1 MHz, the voltage needed for an oil/water emulsion may become excessive. Above 100 MHz parasitic losses, caused by, for example, stray capacitances and inductances, may become excessive.

Figure 4A:
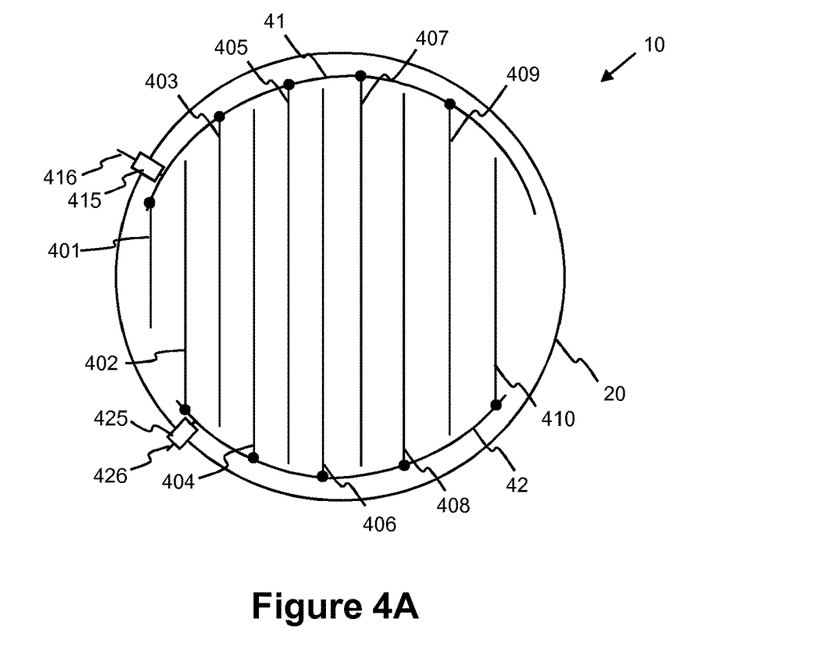
FIG. 4A is an end view of the applicator of FIG. 3.
Figure 4B:
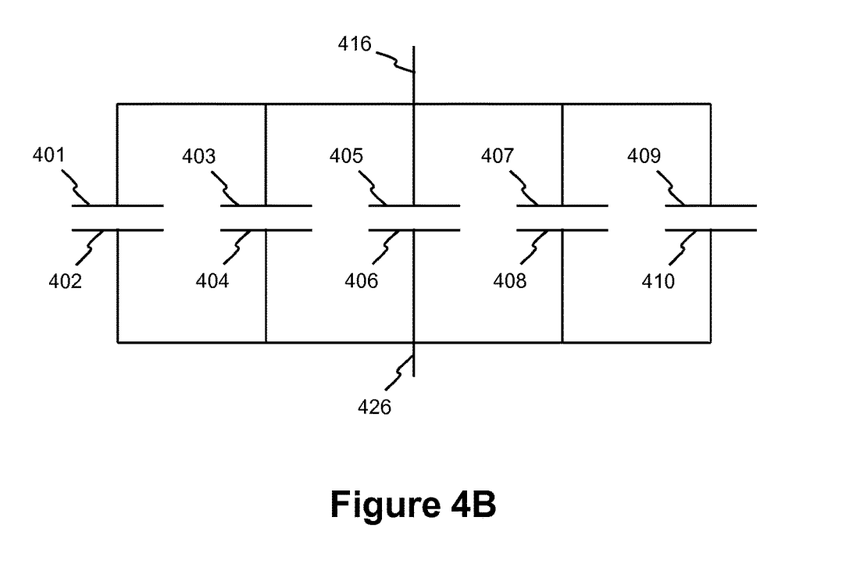
FIG. 4B is an equivalent circuit of the capacitors of the applicator of FIG. 3.

In a first embodiment shown in FIGS. 3 and 4A the plates are connected in parallel, as indicated in the equivalent circuit of FIG. 4B. As best shown in FIG. 4A, in this first embodiment alternate plates 401, 403, 405, 407, 409 are electrically connected by a first electrical arcuate bus 41 whereas the remaining plates 402, 404, 406, 408, 410 are electrically joined by a second electrical arcuate bus 42 opposed to the first electrical arcuate bus 41.

The first bus 41 is also electrically joined to a connector 416 which passes through a wall of the chamber 20 through an insulator 415. Similarly, the second bus 42 is electrically joined to a connector 426 which passes through a wall of the chamber 20 through an insulator 425. One set of plates may be earthed or the alternate plates may be driven differentially. Where one of the sets of plates is to be earthed the plates may be electrically connected to an earthed wall of the chamber instead of being connected to a bus.

It will be understood that one of the terminals 416, 426, could have r.f. applied to it, and the other could be earthed. As a practical matter, it would be preferable to insert an insulating layer between the driven plate and the adjacent wall of the chamber, to prevent arcing. This would create a capacitance to earth additional to those shown in FIG. 4B. As an alternative, both terminals could be driven by r.f. in antiphase. In this case, both buses 41, 42, could be separated from the chamber by means of insulating material.

Figure 5A:
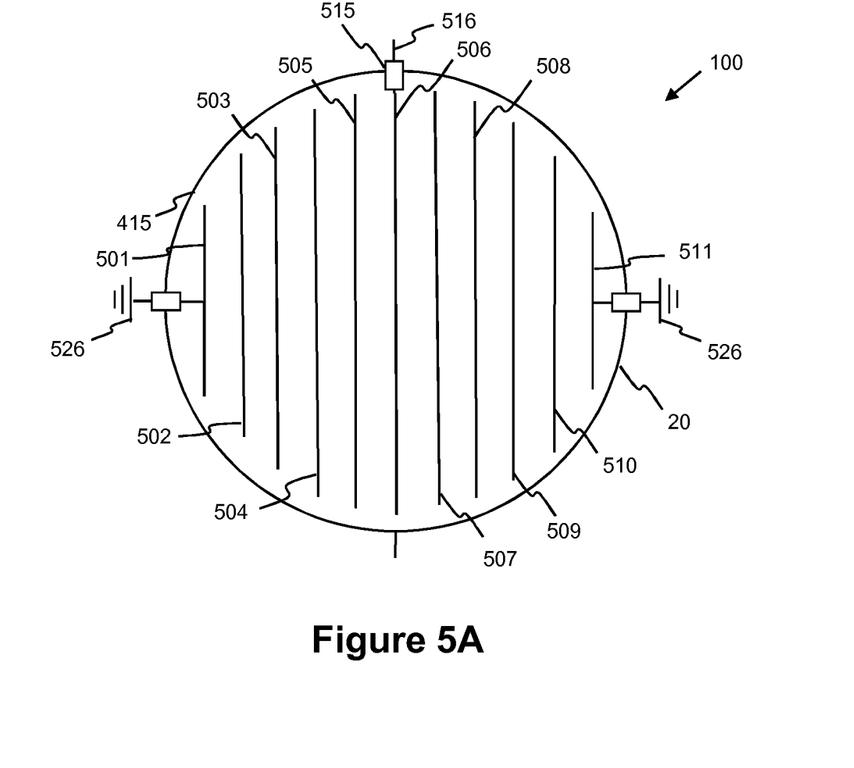
FIG. 5A is an end view of the applicator of FIG. 5.
Figure 5B:
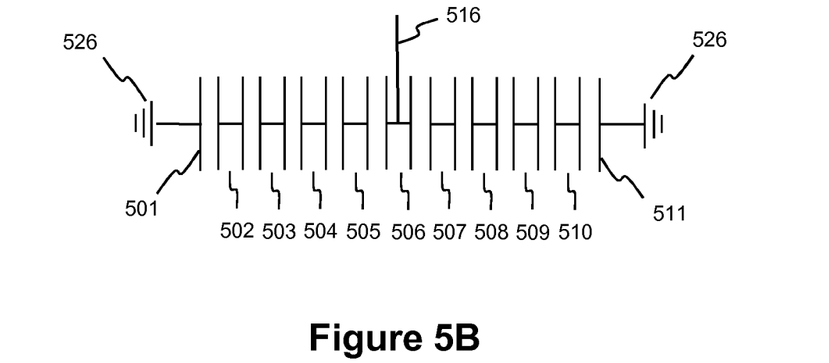
FIG. 5B is an equivalent circuit of the capacitors of the applicator of FIG. 5.

In a second embodiment shown in FIGS. 5 and 5A the plates are connected in series, as indicated in the equivalent circuit of FIG. 5B. As best shown in FIG. 5A, in this second embodiment a central plate 506 is connected to a connector 516 which passes through an insulator 515 in the wall of the cylindrical chamber 20, the end, or outermost, plates 501, 511 are earthed by an earth connector 526, whereas the remaining intervening plates 502-505 and 507-510 are electrically floating. Alternatively central plate 506 and the end plates 501, 511 are driven differentially. It will be understood that a larger voltage is required in this second embodiment with plates connected in series than in the previously described first embodiment with parallel plates, in order to create a same electric field between neighboring plates in both embodiments. However, power in a range 100 W to 100 kW may be applied in both versions.

Referring to FIG. 5A, a driving voltage is applied to terminal 516 only and additional terminals are connected through insulated bushings, like 515, to the end plates 501, 511. If terminal 516 is driven, these additional terminals could be earthed. Alternatively, the terminal 516 could be earthed, and the additional terminals could be driven in anti-phase. An anti-phase drive could be produced from a transformer output winding, having an earthed centre tap.

Although rectangular plates have been illustrated, the plates may be shaped hydrodynamically to minimise reduction drag imposed on a fluid flowing through the chamber. Alternatively, or in addition, the plates may be coated with a low-drag coating.

It will be understood that although the electrodes 401-409, 501-511 are referred to as capacitor plates, the electrodes can alternatively be grids rather than solid plates.

Moreover, it will be understood that although the electrode plates are advantageously substantially vertical so that water droplets falling towards the bottom of the chamber under gravity do not collect on the plates, the chamber is not necessarily horizontal but a longitudinal axis of the chamber could either be inclined to the horizontal or be vertical or substantially vertical. If the electrode plates are substantially horizontal they are preferably formed from grids so that water does not collect on the plates, but passes through the grids.

A tapering chamber may be used rather than a right circular cylindrical chamber.

In use, a radio frequency field is applied to the terminals 416, 426; 516, 526 to generate a substantially equal RF field between each pair of neighboring plates. By radio frequency a frequency between 30 kHz and 300 GHz is to be understood. Referring to FIGS. 1, 2, 3 and 5, an emulsion to be separated is passed through the treatment chamber in a direction of arrow-headed lines 31, 32 passing between the parallel plates 401-409; 501-511. The field acts differentially to heat water droplets in the emulsion which may heat the oil by conduction, reducing viscosity of the oil. This increases a speed of separation of the emulsion, with the water tending to sink below the oil. The emulsion may be passed to a separation tank for further separation of the emulsion.

A matching circuit may be interposed between the chamber and an RF generator to match the generator to the load for maximum power application to the fluid. Dielectric constant and other parameters of the fluid to be treated may be monitored upstream of the chamber in order to match the field applied to the load to be irradiated.

As described, embodiments of the invention may have more than two capacitor electrodes within the chamber. However, it will be understood that the applicator could work with a single driven plate, with the adjacent surfaces of the chamber forming two other electrodes.

A certain level of power is needed to provide energy to the dielectric fluid, particularly to an oil/water emulsion, and spacing between electrode plates determines how much power can be applied. Additional plates, in addition to a minimum of two, allows an increase in power applied, and distributes the electric field and controls power density in the fluid as required. Normally, there would therefore be more than two plates mounted in the chamber.

It will be understood that the chamber does not necessarily have a circular cross-section, nor are the plates necessarily arranged vertically. In fact, it is not essential to have an equal r.f. field between neighboring plates, because, for example, a rate of flow of a fluid to be irradiated may be lower at a periphery of a chamber, requiring a lower field to impart a same energy per unit volume of dielectric fluid than away from the periphery. However, while various possible alternatives for the electrodes may be employed, the illustrated version of longer plates at the sides, remains the presently preferred arrangement. Areas of the plates are preferably equal if flow rates are equal across the chamber.

Figure 6A:
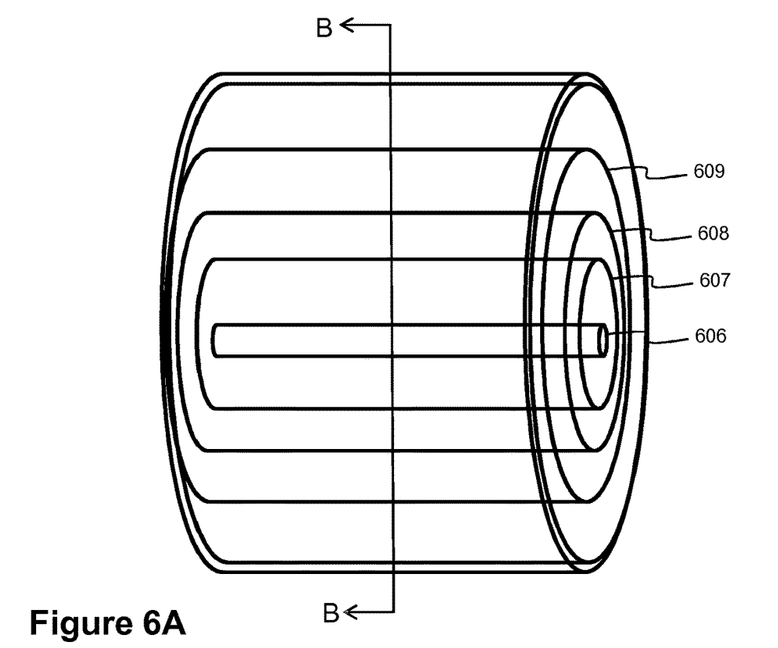
FIG. 6A shows a perspective view of an alternative embodiment of an applicator in which the electrodes are cylindrical.
Figure 6B:
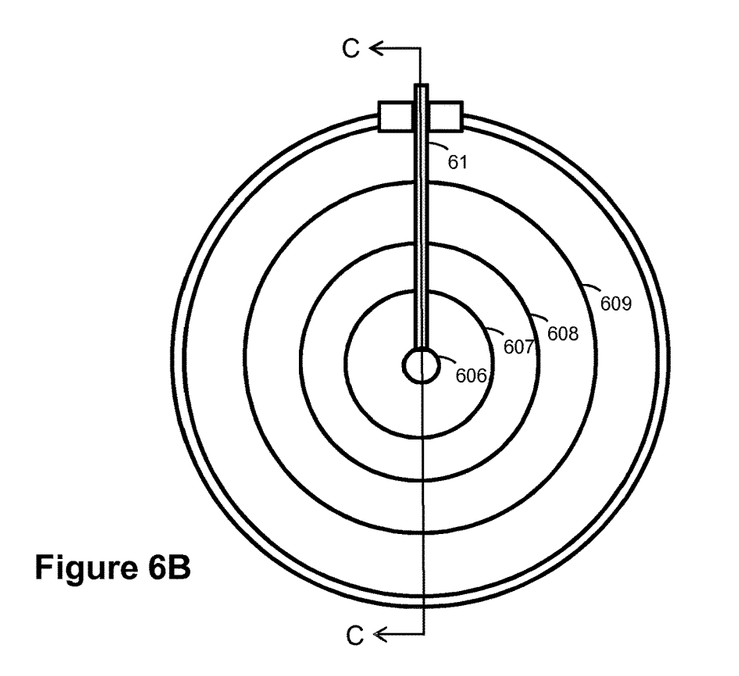
FIG. 6B is a vertical transverse cross-section along the line B-B of FIG. 6A in which the electrodes are connected in series.
Figure 6C:
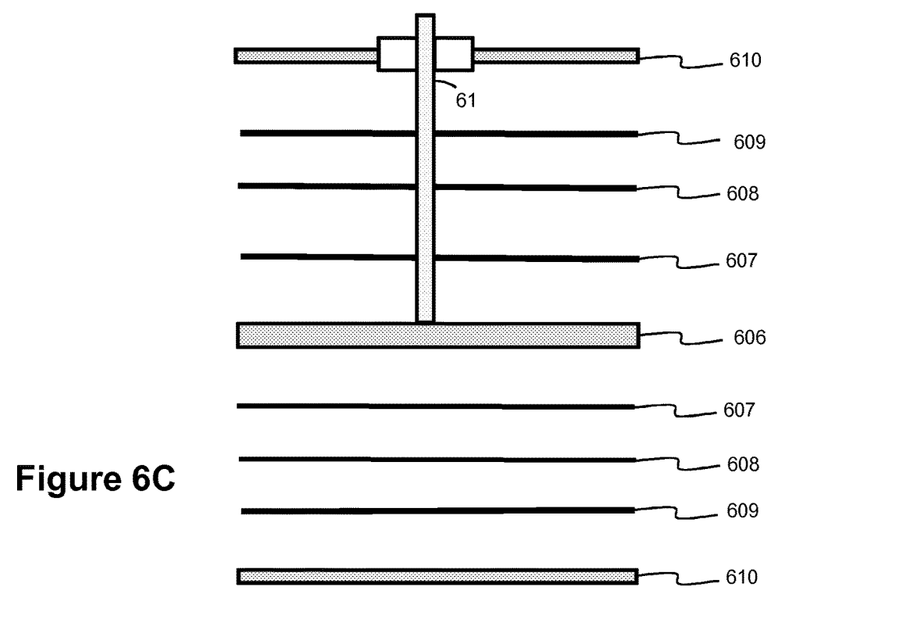
FIG. 6C is a vertical longitudinal cross-section along the line C-C of FIG. 6B.
Figure 7A:
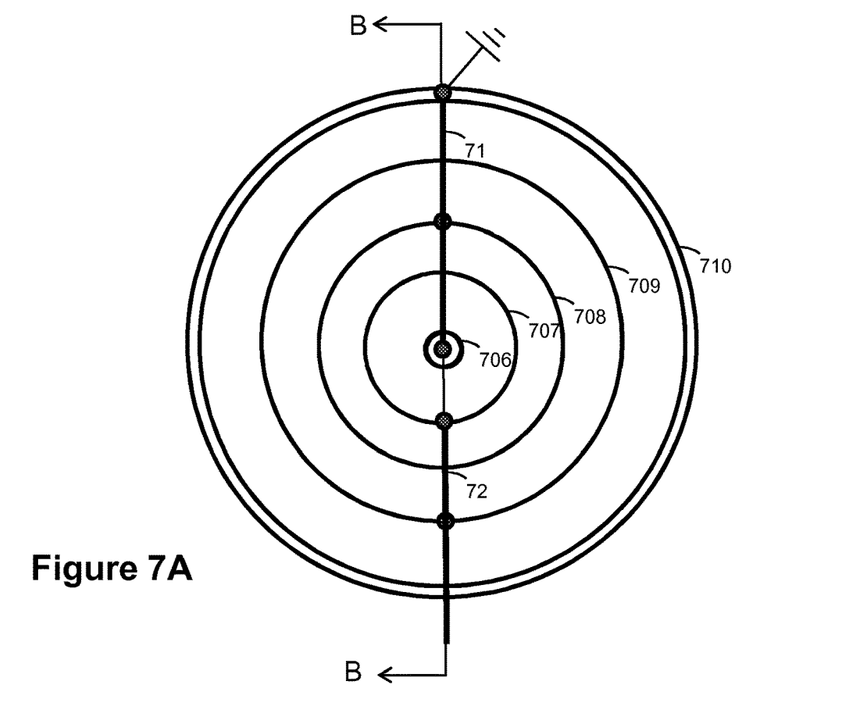
FIG. 7A is a vertical transverse cross-section along the line B-B of FIG. 6A in which the electrodes are connected in parallel.
Figure 7B:
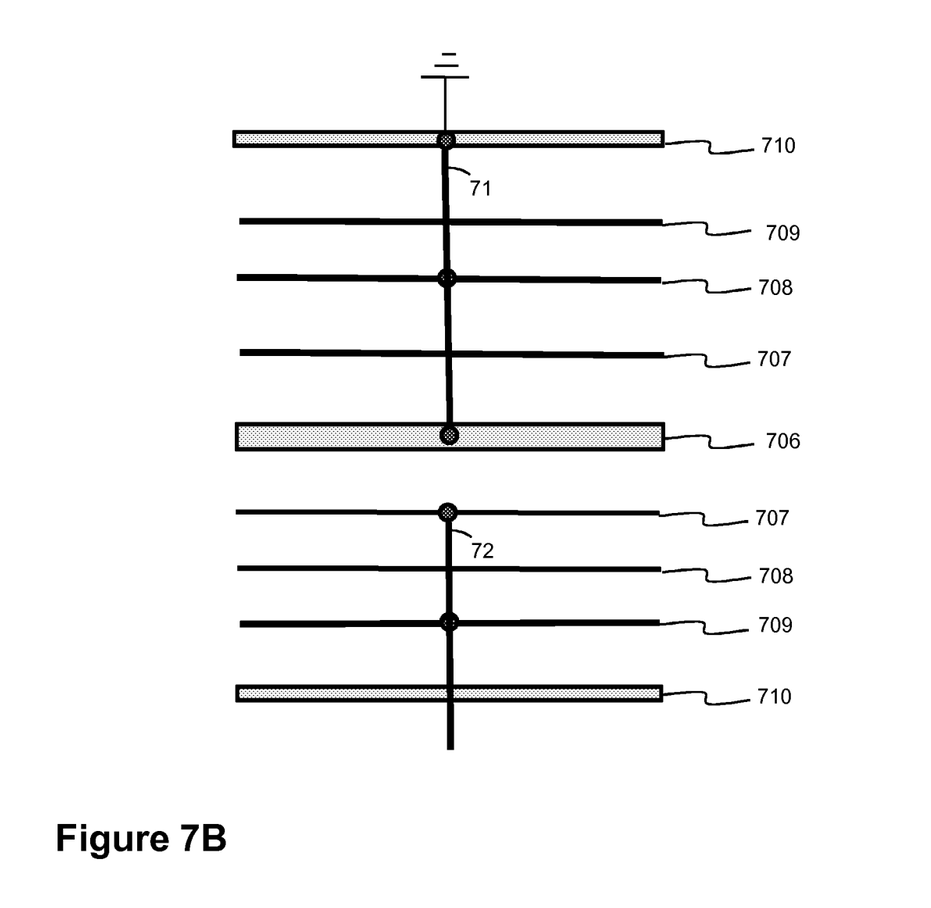
FIG. 7B is a vertical longitudinal cross-section along the line B-B of FIG. 7A.

Moreover, the electrode plates are not necessarily parallel planar plates. As shown in FIGS. 6 and 7 the electrode plates are coaxial hollow cylinders. Thus, central plate 406 is replaced by a hollow cylinder 606, plates 405, 407 are replaced by hollow cylinders of increasing diameter, 607, 608 etc. Such coaxial cylinders can be arranged in a series capacitor configuration as shown in FIGS. 6B and 6C or in a parallel capacitor configuration as shown in FIGS. 7A and 7B, similar to those of FIGS. 4 and 5. For the parallel connection, alternate cylinders are joined, e.g. by a first wire link 71 and the interspersed cylinders joined e.g. by a second wire link 72. For series connection, just the central cylinder 606 is driven. The hollow cylindrical electrodes would have the same alternatives for being driven in a reverse manner or differentially as for the embodiments of FIGS. 4 and 5.

It will be understood that if it is desired that the concentric plates have equal area in order to apply an equal field between plates, axial lengths of the plates may decrease from the innermost cylindrical plate to the outermost cylindrical plate. Alternatively, or in addition, equal energy may be applied between the plates by differential radial spacing of the plates, also taking into account a different volume of liquid, and probably a different flow rate of liquid, to be radiated between different cylindrical plates.

The plates may have an insulating coating to prevent arcing if water collects between the plates.

Two or more treatment chambers may be used in parallel so that a treatment chamber can be taken offline for maintenance without interrupting the flow through other chambers. Any fouling of the electrode plates may be detected by detecting impedance changes of the treatment chamber.

Although the apparatus has been described for increasing a settlement speed of oil and water emulsions, it will be understood that the apparatus can be used for heating any flowing dielectric material.

It will be understood that the emulsion passing through the chamber may be at a pressure considerably above atmospheric pressure, for example at 6.times.10.sup.6 Pa (60 bar) typically experienced in pipelines from an oil well.

It is presently understood that the invention relies on dielectric heating to separate an emulsion. The emulsion acts as a lossy dielectric between the capacitor electrodes, the dielectric loss taking place mainly in the water and very little in the oil. Because the minute water globules are subject to dielectric heating, the oil surrounding each globule is heated, and the viscosity of the surrounding oil is thereby reduced, enabling the minute water globules to settle out at an increased rate.

The invention claimed is:

1. An apparatus for applying electromagnetic energy to heat a dielectric fluid comprising:
   a. chamber arranged to contain the dielectric fluid;
   b. at least three electrodes spaced apart across one dimension of the chamber; and
   c. an electrical conductor arrangement electrically connected to the electrodes to apply respective radio frequency electric fields between neighboring ones of the electrodes, such that at least two such radio frequency field regions are set up across the one dimension of the chamber, and including means for arranging the at least three electrodes to apply substantially equal electromagnetic energy per unit volume of the dielectric fluid in each of the at least two radio frequency field regions between neighboring ones of the at least three electrodes,
   wherein the apparatus is arranged to cause the dielectric fluid to flow in substantially parallel flow streams in a same direction between the neighboring ones of the at least three electrodes.

2. The apparatus of claim 1, wherein areas and spacing of neighboring pairs of the electrodes are determined dependent on a volume and flow rate of dielectric fluid therebetween such that substantially equal electromagnetic energy per unit volume of dielectric fluid is applied between neighboring ones of the at least three electrodes.

3. The apparatus of claim 1, wherein the chamber is of substantially circular cross-section.

4. The apparatus of claim 1, wherein the at least three electrodes are substantially planar and substantially mutually parallel or substantially cylindrical and substantially coaxial.

5. The apparatus of claim 1, wherein the apparatus is arranged to apply a substantially equal electromagnetic field between neighboring ones of the at least three electrode means.

6. The apparatus of claim 1, wherein neighboring electrodes have differing vertical extents and differing horizontal extents and a substantially equal area.

7. The apparatus of claim 1, wherein the chamber is cylindrical.

8. The apparatus of claim 1, wherein the chamber comprises an inlet and an outlet to allow the dielectric fluid to be irradiated as the dielectric fluid flows through the chamber.

9. The apparatus of claim 1, wherein the chamber is a right circular cylinder.

10. The apparatus of claim 1, wherein the apparatus is arranged to irradiate an oil and water emulsion or an oil and water dispersion.

11. A method of heating a dielectric fluid by applying electromagnetic energy comprising:
    containing the dielectric fluid in a chamber wherein at least three electrodes are spaced apart across one dimension of the chamber;
    applying respective radio frequency electric fields between neighboring ones of the electrodes, such that at least two radio frequency fields are set up across the one dimension of the chamber, further comprising a step of arranging the three electrodes to apply substantially equal radio frequency electromagnetic energy per unit volume of dielectric fluid in each of the at least two radio frequency field regions between neighboring ones of the at least three electrodes; and
    flowing the dielectric fluid in substantially parallel flow streams in a same direction between the neighboring ones of the at least three electrodes.

12. The method of claim 11, wherein applying radio frequency electromagnetic energy comprises applying a substantially equal radio frequency electric field between neighboring ones of the at least three electrodes.

13. The method of claim 11, wherein the at least three electrodes have differing vertical extents and differing horizontal extents and a substantially equal area.

14. The method of claim 11, further comprising flowing the dielectric fluid through an inlet and an outlet of the chamber to irradiate the dielectric fluid within the chamber.

15. The method of claim 11, further comprising irradiating an oil and water emulsion or an oil and water dispersion.

16. An apparatus for applying electromagnetic energy to heat a dielectric fluid comprising:
    a. chamber arranged to contain the dielectric fluid;
    b. at least three electrodes spaced apart across one dimension of the chamber; and
    c. an electrical conductor arrangement electrically connected to the electrodes to apply respective radio frequency electric fields between neighbouring ones of the electrodes, such that at least two such radio frequency field regions are set up across the one dimension of the chamber, wherein the at least three electrodes are arranged to apply substantially equal electromagnetic energy per unit volume of the dielectric between neighbouring ones of the at least three electrodes, wherein neighboring electrodes of the at least three electrodes have different vertical extents and different horizontal extents and a substantially equal area.

* * * * *